United States Patent [19]
Takemae et al.

[11] Patent Number: 4,942,905
[45] Date of Patent: Jul. 24, 1990

[54] COMPOSITE HOSE CONSTRUCTION

[75] Inventors: Eiji Takemae; Masakazu Koizumi, both of Hiratsuka; Tadashi Ishibashi, Kawaguchi, all of Japan

[73] Assignees: The Yokohama Rubber Co., Ltd.; Chiyoda Kenki Co., Ltd., both of Japan

[21] Appl. No.: 270,326

[22] Filed: Nov. 14, 1988

[30] Foreign Application Priority Data

Nov. 18, 1987 [JP] Japan .................................. 62-289632

[51] Int. Cl.⁵ .............................................. F16L 11/12
[52] U.S. Cl. ..................................... 138/118; 138/103; 138/106; 138/111; 138/178; 138/DIG. 8
[58] Field of Search ............... 138/103, 106, 107, 118, 138/110, 111, 112, 172, 178, DIG. 8; 464/181, 183; 285/137.1, 188

[56] References Cited

U.S. PATENT DOCUMENTS

| | | | |
|---|---|---|---|
| 2,527,270 | 10/1950 | Levin | 138/111 |
| 3,715,454 | 2/1973 | Kleykamp | 138/121 |
| 3,955,599 | 5/1976 | Walker | 138/103 |
| 4,427,033 | 1/1984 | Ege | 138/174 |
| 4,514,103 | 4/1985 | Wise et al. | 138/106 |
| 4,840,200 | 6/1989 | Creedon | 138/172 |

FOREIGN PATENT DOCUMENTS 1247607  7/1986  U.S.S.R. ............................ 138/118

Primary Examiner—James E. Bryant, III
Attorney, Agent, or Firm—Finnegan, Henderson, Farabow, Garrett & Dunner

[57] ABSTRACT

A composite hose for heavy-duty purposes is disclosed which is essentially comprised of a flexible main hose of increased diameter and a subhose disposed longitudinally thereover. The subhose has a reinforcing layer oriented at a specified angle to thereby dilate widthwise upon application of pressure, allowing the main hose to readily bend in a predetermined direction.

4 Claims, 4 Drawing Sheets

COMPOSITE HOSE CONSTRUCTION

BACKGROUND OF THE INVENTION

1. Field of the Invention

This invention relates to composite hoses of enhanced bendability suitable for use in transporting or otherwise handling fluids under adverse conditions.

2. Description of the Prior Art

In conveying fluids from their sources of supply to any selected sites, attempts have been made to manually forcibly bend or position a hose at its free end toward the site. Because this type of hose is rather rigid in nature and heavy in weight, such prior loading is unsatisfactory in that it is encountered with the following problems.

1. Limited manpower to permit sufficient bending of large-diameter, heavy-weight hoses.
2. Interrupted loading operation depending upon the conditions involved.
3. Difficult remote control.
4. Laborious, time-consuming but yet dangerous.

A certain flexible hose is known which is constructed with a cord of reinforcement oriented at an angle of not more than 54°44' in an axial plane as disclosed for instance in Japanese Patent Publication No. 52-40378. An angle of 54°44' is taken to mean the maximum angle at which the reinforcing cord tends to laterally dilate when pressure is applied. Due to the cord being so formed, this prior hose expands widthwise and shortens lengthwise under pressure.

SUMMARY OF THE INVENTION

With the foregoing difficulties of the prior art in view, the present invention seeks to provide a new and improved composite hose construction which is highly capable of bending a main hose of large diameter and heavy weight at a selected angle and in a predetermined direction without resort to manpower. The hose contemplated under the invention ensures safe and efficient loading particularly for heavy-duty purposes under all-weather conditions.

Many other objects and advantages of the invention will be better understood from the following description upon reading in connection with the accompanying drawings in which certain preferred embodiments of the invention are shown for purposes of illustration.

According to the invention, there is provided a composite hose comprising a flexible main hose of large diameter, and a subhose of small diameter having a layer of reinforcement and disposed longitudinally over and attached integrally with the main hose by fastening means, the layer of reinforcement being oriented to laterally dilate when pressure is applied thereby reducing the overall length of the subhose, whereby the main hose is bendable in a predetermined direction by the action of the subhose.

DETAILED DESCRIPTION OF THE INVENTION

Figure 2:
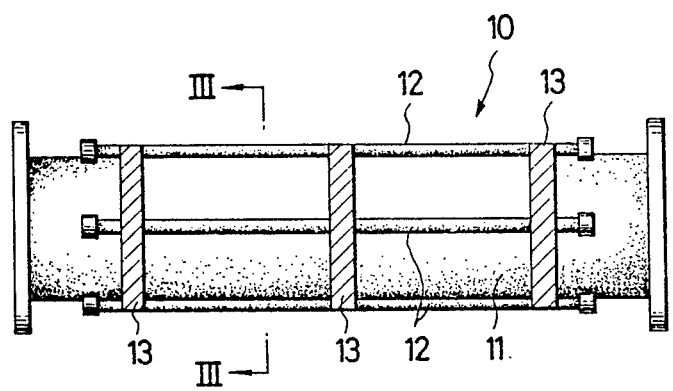
FIG. 2 is a side-elevational view showing one embodiment of the composite hose provided in accordance with the present invention.
Figure 3:
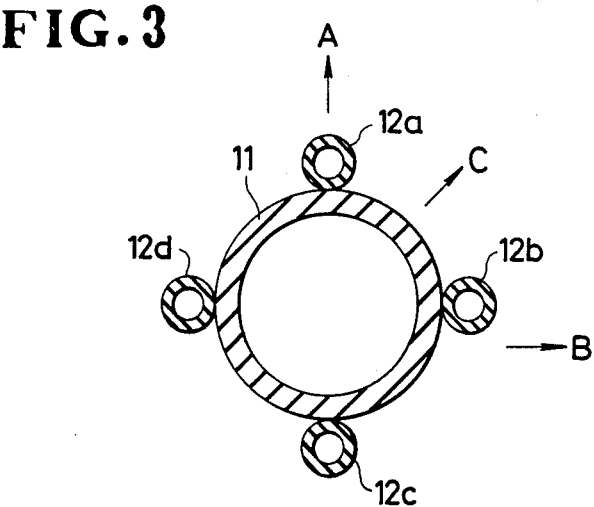
FIG. 3 is a cross-sectional view taken along the line III—III of FIG. 2.

Referring now to the drawings and in particular to FIGS. 2 and 3, there is shown a composite hose 10 constructed in accordance with the principles of the present invention. The composite hose 10 is essentially comprised of a main hose 11 of increased diameter, and a subhose 12 of reduced diameter disposed longitudinally over and secured integrally with the main hose 11 by any suitable fastening means such as strips of metal 13 extending circumferentially on the subhose 12 and also the main hose 11. In this embodiment, the subhose 12 is shown as being composed of four hoses 12a, 12b, 12c and 12d located in spaced-apart relation to one another and arranged in intimate contact with the main hose 11.

Figure 6A:
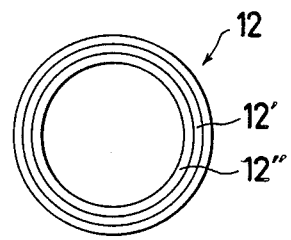
FIGS. 6A and 6B are radial cross-section and elevational views, respectively, of a subhose employed in the composite hose of the present invention.
Figure 6B:
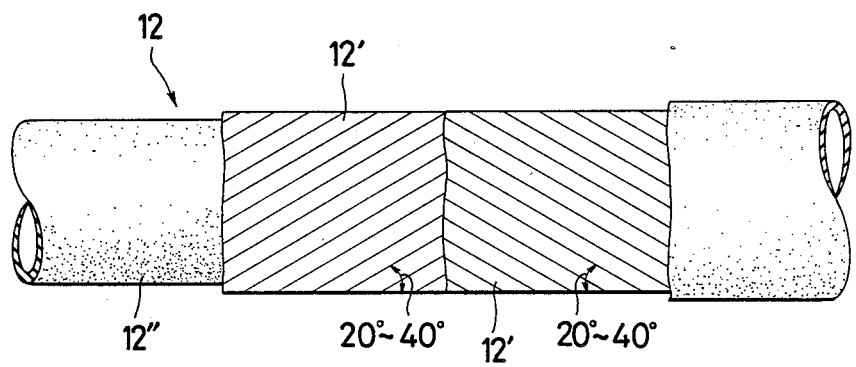

The subhose 12 is so structured as to have a layer of reinforcement oriented at a specified angle with respect to the longitudinal axis. Referring to FIGS. 6A and 6B, the subhose 12 is comprised of a subhose body 12" and a layer of reinforcement 12' oriented at an angle, preferably in the range of 20–40 degrees, with respect to the longitudinal axis. The reinforcing layer is sensitive to lateral dilation under pressure and thus capable of reducing the overall length of the subhose. Detailed orientations for the reinforcement are not shown as they are commonly known in the art.

The subhose should preferably have a diameter in the range of 1/10–1/5 times the main hose. Diameters if smaller than 1/10 times would invite added subhose and increased pressure and if greater than 1/5 times would result in a subhose being bulky, leading to handling inconveniences and cost burdens.

The angle of the reinforcing layer to be oriented should preferably be in the range of 20–40 degrees in an axial plane. Departures from the specified range would fail to render the finished subhose less dilative even under pressure, inducing insufficient bendability of the main hose.

Upon application of pressure, the reinforcing layer thus oriented gets dilative, approaching to the angle of 54°44' so that the subhose expands and shortens, allowing the main hose to bend at a selected angle and in a predetermined direction in a remote-control fashion.

There is no particular restriction imposed on the number of subhoses. The main hose when combined with one or two, and three or more, subhoses is bendable in one dimension and three dimensions, respectively. If the main hose is required to be bent in a direction indicated by the arrow A in FIG. 3, pressure may be applied onto the subhose 12a. Bending in the B direction may be effected by placing the hose 12b in pressurized condition and bending in the C direction by feeding pressure to both the hose 12a and the hose 12b.

Figure 5:
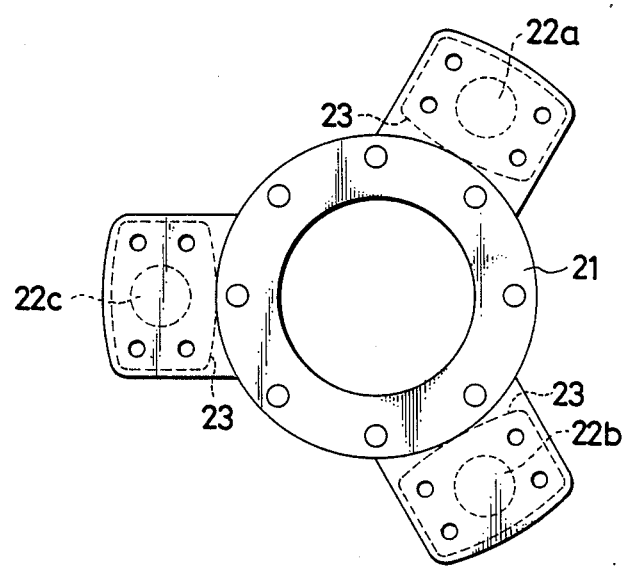
FIG. 5 is a side view seen from a top end of the composite hose of FIG. 4.
Figure 4:
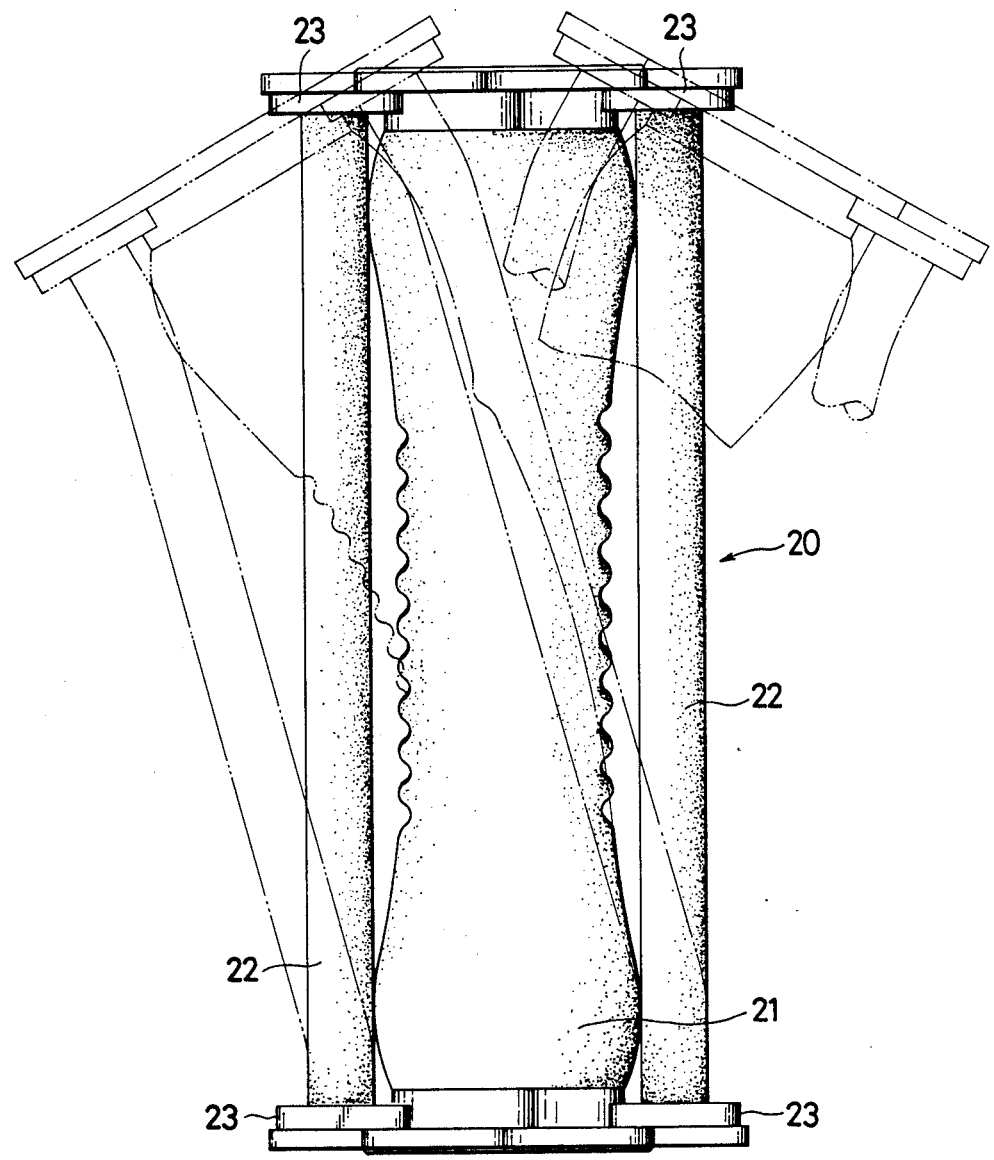
FIG. 4 is a front view showing another embodiment of the invention.

FIGS. 4 and 5 are directed to a second embodiment of the invention in which a composite hose 20 is made up of a main hose 21 and a subhose 22 located slightly remote therefrom. The hoses 21 and 22 are similar in diameter and structure to the hoses 11 and 12 of the first embodiment. Three subhoses 22a, 22b and 22c are illustrated in the second embodiment. Each of the hoses 22a to 22c is fixedly attached at both ends to fastening means, say flange portions 23 connected to opposite ends of the main hose 21. In bending the hose 21 in a given direction or directions, either one or two of the hoses 22a to 22c may be pressurized as is in the first embodiment.

For use of the composite hose 10 or 20 according to the invention, the subhoses 12a to 12d or 22a to 22c are coupled to a pressure-supplying hose, not shown, with a change-over valve interposed therebetween. The valve is remote-controlled to selectively feed pressure to the subhoses.

Figure 1:
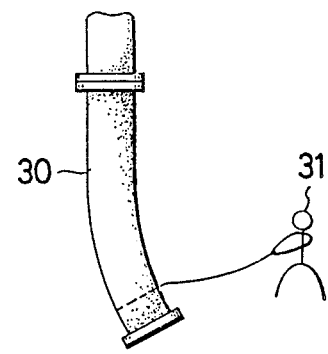
FIG. 1 is a schematic representation of the prior art, showing the manner in which a flexible hose is being manually bent at one end.

The prior art loading is shown in FIG. 1 in which a flexible hose 30 is being forcibly bent by the operator 31.

Having thus described the invention, it will be apparent to those skilled in the art that various changes or modifications may be made without departing from the scope of the appended claims.

We claim:

1. A composite hose comprising a flexible main hose having a first diameter, and at least one subhose having a diameter smaller than said first diameter and having a layer of reinforcement, said subhose being disposed longitudinally over and secured integrally with said main hose by fastening means, said layer of reinforcement being oriented at a specified angle with respect to the longitudinal axis of said subhose to constitute a means to cause said main hose to bend in a predetermined direction upon the application of pressure to said subhose where said subhose laterally dilates and the overall length thereof is reduced to bend said main hose in a predetermined direction.

2. The hose according to claim 1 wherein said subhose has a diameter in the range of 1/10–1/5 times the diameter of said main hose.

3. The hose according to claim 1 wherein said layer of reinforcement has an angle of orientation in the range of 20–40 degrees in an axial plane.

4. The hose according to claim 1 further including a plurality of spaced-apart subhose arranged contiguous to or remote from said main hose.

* * * * *